United States Patent
Marshak et al.

(10) Patent No.: US 8,566,553 B1
(45) Date of Patent: Oct. 22, 2013

(54) TECHNIQUES FOR AUTOMATED EVALUATION AND MOVEMENT OF DATA BETWEEN STORAGE TIERS

(75) Inventors: Marik Marshak, Newton, MA (US); Xiaomei Liu, Natick, MA (US); Hui Wang, Upton, MA (US); Sachin More, Northborough, MA (US); Adnan Sahin, Needham, MA (US)

(73) Assignee: EMC Corporation, Hopkinton, MA (US)

( * ) Notice: Subject to any disclaimer, the term of this patent is extended or adjusted under 35 U.S.C. 154(b) by 687 days.

(21) Appl. No.: 12/803,571

(22) Filed: Jun. 30, 2010

(51) Int. Cl.
G06F 12/00 (2006.01)
G06F 13/00 (2006.01)
G06F 13/28 (2006.01)

(52) U.S. Cl.
USPC .......................................................... 711/170

(58) Field of Classification Search
None
See application file for complete search history.

(56) References Cited

U.S. PATENT DOCUMENTS

| | | | |
|---|---|---|---|
| 5,206,939 A | 4/1993 | Yanai et al. | |
| 5,778,394 A | 7/1998 | Galtzur et al. | |
| 5,845,147 A | 12/1998 | Vishlitzky et al. | |
| 5,857,208 A | 1/1999 | Ofek | |
| 2011/0167217 A1* | 7/2011 | Montgomery | 711/114 |
| 2011/0197046 A1* | 8/2011 | Chiu et al. | 711/171 |

OTHER PUBLICATIONS

Lee et al., Advances in Flash Memory SSD Technology for Enterprise Database Applications, 2009, ACM, 8 pages.*
U.S. Appl. No. 12/586,925, filed Sep. 29, 2009, "Techniques for Performing Data Migration,".
U.S. Appl. No. 12/803,570, filed Jun. 30, 2010, "Techniques for Dynamic Data Storage Configuration in Accordance With an Allocation Policy,".

* cited by examiner

Primary Examiner — Christian P Chace
Assistant Examiner — Gary W Cygiel
(74) Attorney, Agent, or Firm — Muirhead and Saturnelli, LLC

(57) ABSTRACT

Described are techniques for configuring data storage. A plurality of devices is selected. It is determined, for each of the plurality of devices, whether data for said each device should be located in a first storage tier or another storage tier. The first storage tier is higher performance storage tier than the other storage tier. For each of the plurality of devices that the determining step determines should be located in the first storage tier, data of said each device is automatically located on a physical storage device of the first storage tier.

20 Claims, 10 Drawing Sheets

TECHNIQUES FOR AUTOMATED EVALUATION AND MOVEMENT OF DATA BETWEEN STORAGE TIERS

BACKGROUND

1. Technical Field

This application generally relates to data storage, and more particularly to techniques used in connection with automated evaluation and migration of data between storage tiers.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. Such storage devices are provided, for example, by EMC Corporation of Hopkinton, Mass. and disclosed in U.S. Pat. Nos. 5,206,939 to Yanai et al., 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units, logical devices, or logical volumes (LVs). The logical disk units may or may not correspond to the actual disk drives. Allowing multiple host systems to access the single storage device unit allows the host systems to share data stored therein.

In connection with data storage, a variety of different technologies may be used. Data may be stored, for example, on different types of disk devices and/or flash memory devices. In connection with data storage configuration and management of a system having a variety of different devices and storage technologies, one problem that exists is determining what data to store on which physical devices. It may be desirable to use a technique providing for automated evaluation regarding what data to store on which physical devices in order to maximize data storage system performance. It may be desirable that the techniques provide for movement of data across or between different storage tiers as may be needed based on changing workload.

SUMMARY OF THE INVENTION

In accordance with one aspect of the invention is a method for configuring data storage. a plurality of devices is selected. It is determined, for each of said plurality of devices, whether data for said each device should be located in a first storage tier or another storage tier. The first storage tier is a higher performance storage tier than the other storage tier. For each of the plurality of devices that said determining determines should be located in the first storage tier, automatically locating data of said each device on a physical storage device of the first storage tier. The first storage tier may include one or more flash memory devices and said another storage tier may include one or more physical devices having lower performance characteristics than said one or more flash memory devices. The other storage tier may be one of a plurality of other storage tiers which are lower performance storage tiers than the first storage tier. The method may also include determining a score for each of said plurality of devices; and generating a sorted list of said plurality of devices based on the scores for said plurality of devices, said sorted list being sorted in increasing order. The method may also include performing first processing for each of said plurality of devices to determine said score for said each device. The first processing may include calculating a read miss density for said each device representing an average number of read misses per unit of storage for said each device; calculating a write percentage for said each device representing what portion of physical storage accesses for data of said each device are writes; determining a priority for said each device; and determining said score for said each device using the read miss density, the write percentage and the priority for said each device. The write percentage may be used to determine a cost associated with the read miss density. The write percentage may be used to determine a weight for the read miss density. The cost may represent a normalized value. The cost may be determined using a characteristic curve for said one or more flash devices. The characteristic curve may indicate an average I/O throughput as a function of write percentage. The method may also include receiving a threshold capacity indicating an amount of storage in said first storage tier; and storing data for a first portion of said plurality of devices on physical devices of said first storage tier, wherein said total storage capacity of said first portion does not exceed said threshold capacity, each device in said first portion having a score determined using said first processing which is greater than or equal to each score determined using said first processing for each of said plurality of devices not included in said first portion. The method may also include determining a promotion threshold associated with a first position in said sorted list, wherein each device in said sorted list having a position above said first position is moved to said first storage tier if currently included in said another storage tier. The method may include determining a demotion threshold associated with a second position in said sorted list, wherein each device in said sorted list having a position below said second position is moved from said first storage tier to said another storage tier if currently included in said first storage tier. Each device in the sorted list having a position between said first position and said second position may remain in said first storage tier if currently in said first storage tier and may remain in said another storage tier if currently in said another storage tier. The plurality of devices may be logical volumes.

In accordance with another aspect of the invention is a computer readable medium comprising code stored thereon for configuring data storage, the computer readable medium comprising code which, when executed, performs processing including: selecting a plurality of logical volumes having data stored on physical devices of a plurality of storage tiers, said plurality of storage tiers including a first tier of one or more flash memory devices and a second tier of one or more devices having lower performance than said one or more flash memory devices; determining a score for each of said plurality of logical volumes; determining a ranking of said plurality of logical volumes based on the scores for said plurality of logical volumes; determining a first threshold indicating a first position in said ranking; determining a first portion of said plurality of logical volumes wherein each logical volume in said first portion has a position in said ranking above said first position; and automatically locating data of said first portion of logical volumes on physical devices of said first tier. The first threshold may indicate a total storage capacity of said first tier. The first threshold may be a promotion threshold and each of said plurality of logical volumes having a position in said ranking above said first position is moved into said first tier from another one of said plurality of storage tiers if not currently included in said first tier. A demotion threshold may indicate a second position in said ranking below said first position and each of said plurality of logical volumes having a position in said ranking below said second position may be moved from said first tier to another one of said plurality of storage tiers if currently included in said first tier. Each of said plurality of logical volumes between said first position and said second position may not be moved from a current one of said plurality of storage tiers. The step of determining said score for each of said plurality of logical volumes may further comprise: determining a read miss density for said each logical volume; determining a percentage of writes to physical storage for said each logical volume; determining a cost as a function of sad percentage of writes; determining a priority for said each logical volume; and determining said score in accordance with said read miss density, said percentage of writes, said cost, and said priority.

In accordance with another aspect of the invention is a system comprising a data storage system and a computer readable medium comprising code stored thereon for configuring data storage of the data system. The computer readable medium comprises code for: selecting a plurality of devices; determining, for each of said plurality of devices, whether data for said each device should be located in a first storage tier or another storage tier, said first storage tier being a higher performance storage tier than said other storage tier; and for each of said plurality of devices that said determining determines should be located in the first storage tier, automatically locating data of said each device on a physical storage device of said first storage tier. The first storage tier may include one or more flash memory devices and said another storage tier may include one or more physical devices having lower performance characteristics than said one or more flash memory devices.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
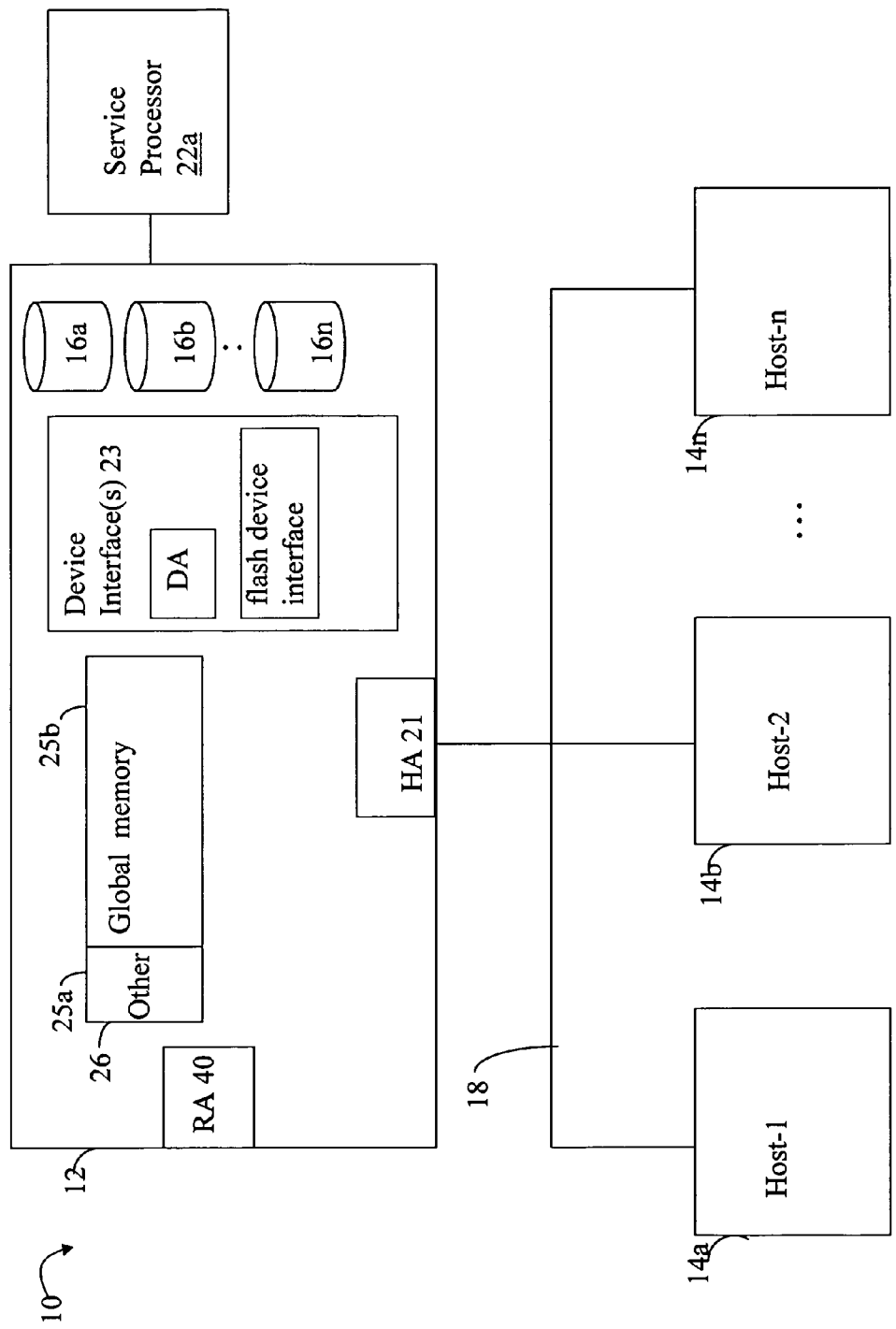
FIG. 1 is an example of an embodiment of a system that may utilize the techniques described herein.

Referring to FIG. 1, shown is an example of an embodiment of a system that may be used in connection with performing the techniques described herein. The system 10 includes a data storage system 12 connected to host systems 14a-14n through communication medium 18. In this embodiment of the computer system 10, and the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as SCSI, Fibre Channel, iSCSI, and the like. Some or all of the connections by which the hosts and data storage system may be connected to the communication medium may pass through other communication devices, such as a Connectrix or other switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

The data storage system 12 may be a data storage array including a plurality of data storage devices 16a-16n. The data storage devices 16a-16n may include one or more types of data storage devices such as, for example, one or more disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving parts. As described in more detail in following paragraphs, the techniques herein may be used in an embodiment in which one or more of the devices 16a-16n are flash devices. More generally, the techniques herein may also be used with any type of SSD although following paragraphs may make reference to a particular type such as a flash device or flash memory device.

The data storage array may also include different types of adapters or directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices or logical volumes (LVs). The LVs may or may not correspond to the actual physical devices or drives 16a-16n. For example, one or more LVs may reside on a single physical drive or multiple drives. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LV(s) residing thereon. A flash device interface may be another type of device interface used in connection with facilitating data transfers to/from the associated flash devices and LV(s) residing thereon. It should be noted that an embodiment may use the same or a different device interface for one or more different types of devices than as described herein.

The device interface, such as a DA, performs I/O operations on a drive 16a-16n. In the following description, data residing on an LV may be accessed by the device interface following a data request in connection with I/O operations that other directors originate. Data may be accessed by LV in which a single device interface manages data requests in connection with the different one or more LVs that may reside on a drive 16a-16n. For example, a device interface may be a DA that accomplishes the foregoing by creating job records for the different LVs associated with a particular device. These different job records may be associated with the different LVs in a data structure stored and managed by each device interface.

Also shown in FIG. 1 is a service processor 22a that may be used to manage and monitor the system 12. In one embodiment, the service processor 22a may be used in collecting performance data, for example, regarding the I/O performance in connection with data storage system 12. This performance data may relate to, for example, performance measurements in connection with a data request as may be made from the different host computer systems 14a 14n. This performance data may be gathered and stored in a storage area. Additional detail regarding the service processor 22a is described in following paragraphs.

It should be noted that a service processor 22a may exist external to the data storage system 12 and may communicate with the data storage system 12 using any one of a variety of communication connections. In one embodiment, the service processor 22a may communicate with the data storage system 12 through three different connections, a serial port, a parallel port and using a network interface card, for example, with an Ethernet connection. Using the Ethernet connection, for example, a service processor may communicate directly with DAs and HAs within the data storage system 12.

Figure 2:
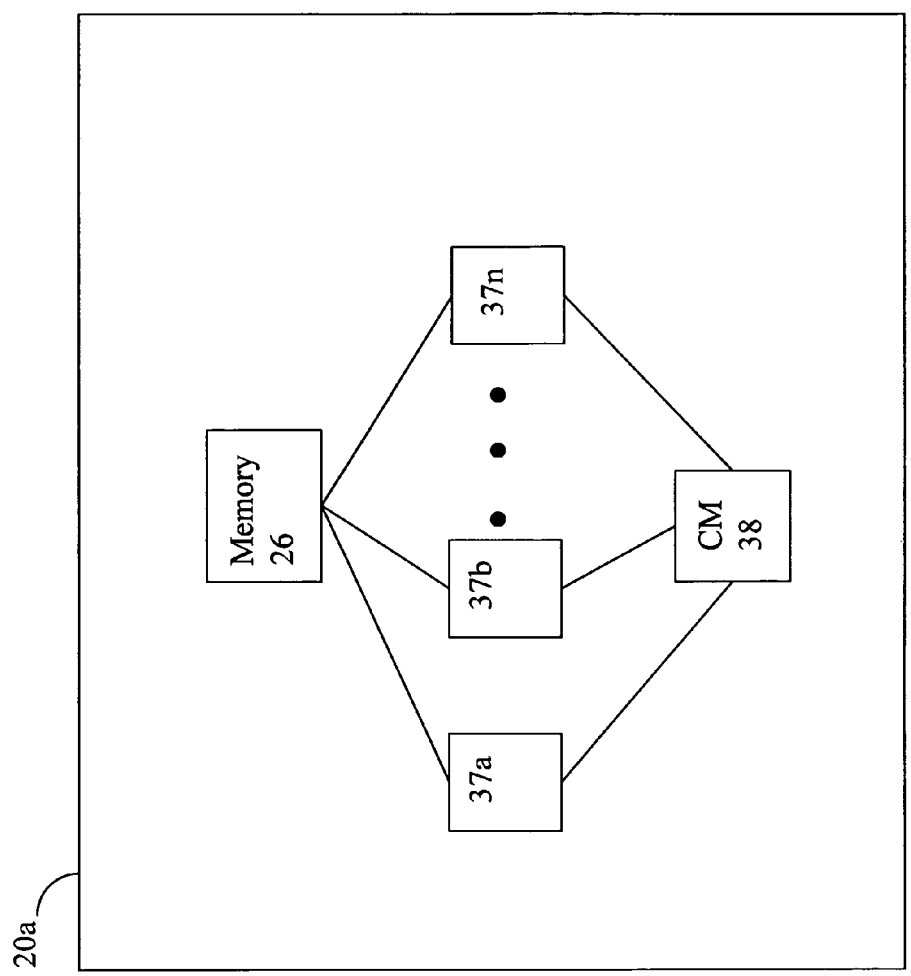
FIG. 2 is a representation of the logical internal communications between the directors and memory included in one embodiment of a data storage system of FIG. 1.

Referring to FIG. 2, shown is a representation of the logical internal communications between the directors and memory included in a data storage system. Included in FIG. 2 is a plurality of directors 37a-37n coupled to the memory 26. Each of the directors 37a-37n represents one of the HAs, RAs, or device interfaces that may be included in a data storage system. In an embodiment disclosed herein, there may be up to sixteen directors coupled to the memory 26. Other embodiments may allow a maximum number of directors other than sixteen as just described and the maximum number may vary with embodiment.

The representation of FIG. 2 also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

With reference back to FIG. 1, components of the data storage system may communicate using GM 25b. For example, in connection with a write operation, an embodiment may first store the data in cache included in a portion of GM 25b, mark the cache slot including the write operation data as write pending (WP), and then later destage the WP data from cache to one of the devices 16a-16n. In connection with returning data to a host from one of the devices as part of a read operation, the data may be copied from the device by the appropriate device interface, such as a DA servicing the device. The device interface may copy the data read into a cache slot included in GM which is, in turn, communicated to the appropriate HA in communication with the host. To further illustrate read operation processing, when the HA 21 receives a read request from a host, it is determined whether the requested read data is in cache. If so, there is a cache hit and the data is retrieved from cache and returned to the host. If the requested data for the read operation is not in cache, there is a cache miss and processing is performed by the data storage system and its components to retrieve the data from the appropriate physical storage device. If the requested read data is not in cache as just described, a read miss has occurred and the time for responding to the read request varies with the particular physical storage device upon which the requested data is stored. The read response time needed to retrieve data from a disk device, for example, is much greater than the read response time needed to retrieve data from a flash device or other SSD device. This is further described in following paragraphs in connection with techniques herein.

As described above, the data storage system 12 may be a data storage array including a plurality of data storage devices 16a-16n in which one or more of the devices 16a-16n are flash memory devices employing one or more different flash memory technologies. In one embodiment, the data storage system 12 may be a Symmetrix® VMAX™ data storage array by EMC Corporation of Hopkinton, Mass. In the foregoing data storage array, the data storage devices 16a-16n may include a combination of disk devices and flash devices in which the flash devices may appear as standard Fibre Channel (FC) drives to the various software tools used in connection with the data storage array. The flash devices may be constructed using nonvolatile semiconductor NAND flash memory. The flash devices may include one or more SLC (single level cell) devices and/or MLC (multi level cell) devices.

It should be noted that the techniques herein may be used in connection with flash devices comprising what may be characterized as enterprise-grade or enterprise-class flash drives with an expected lifetime (e.g., as measured in an amount of actual elapsed time such as a number of years, months, and/or days) based on a number of guaranteed write cycles, or program cycles, and a rate or frequency at which the writes are performed. Thus, a flash device may be expected to have a usage measured in calendar or wall clock elapsed time based on the amount of time it takes to perform the number of guaranteed write cycles. The techniques herein may also be used with other flash devices, more generally referred to as non-enterprise class flash devices, which, when performing writes at a same rate as for enterprise class drives, may have a lower expected lifetime based on a lower number of guaranteed write cycles.

The techniques herein may be generally used in connection with any type of flash device, or more generally, any SSD technology. The flash device may be, for example, a flash device which is a NAND gate flash device, NOR gate flash device, flash device that uses SLC or MLC technology, and the like, as known in the art. In one embodiment, the one or more flash devices may include MLC flash memory devices although an embodiment may utilize MLC, alone or in combination with, other types of flash memory devices or other suitable memory and data storage technologies. More generally, the techniques herein may be used in connection with other SSD technologies although particular flash memory technologies may be described herein for purposes of illustration.

An embodiment in accordance with techniques herein may have one or more defined storage tiers. Each tier may generally include physical storage devices or drives having one or more attributes associated with a definition for that tier. For example, one embodiment may provide a tier definition based on a set of one or more attributes. The attributes may include any one or more of a storage type or storage technology, a type of data protection, device performance characteristic(s), storage capacity, and the like. The storage type or technology may specify whether a physical storage device is an SSD drive (such as a flash drive), a particular type of SSD drive (such using flash or a form of RAM), a type of magnetic disk or other non-SSD drive (such as an FC drive, a SATA (Serial Advanced Technology Attachment) drive), and the like. Data protection may specify a type or level of data storage protection such, for example, as a particular RAID level (e.g., RAID1, RAID-5 3+1, RAID5 7+1, and the like). Performance characteristics may relate to different performance aspects of the physical storage devices of a particular type or technology. For example, there may be multiple types of FC drives based on the RPM characteristics of the FC drives (e.g., 10K RPM FC drives and 15K RPM FC drives) and FC drives having different RPM characteristics may be included in different storage tiers. Storage capacity may specify the amount of data, such as in bytes, that may be stored on the drives. An embodiment may allow a user to define one or more such storage tiers. For example, an embodiment in accordance with techniques herein may define two storage tiers including a first tier of all SSD drives and a second tier of all non-SSD drives. As another example, an embodiment in accordance with techniques herein may define three storage tiers including a first tier of all SSD drives which are flash drives, a second tier of all FC drives, and a third tier of all SATA drives. The foregoing are some examples of tier definitions and other tier definitions may be specified in accordance with techniques herein.

Figure 3:
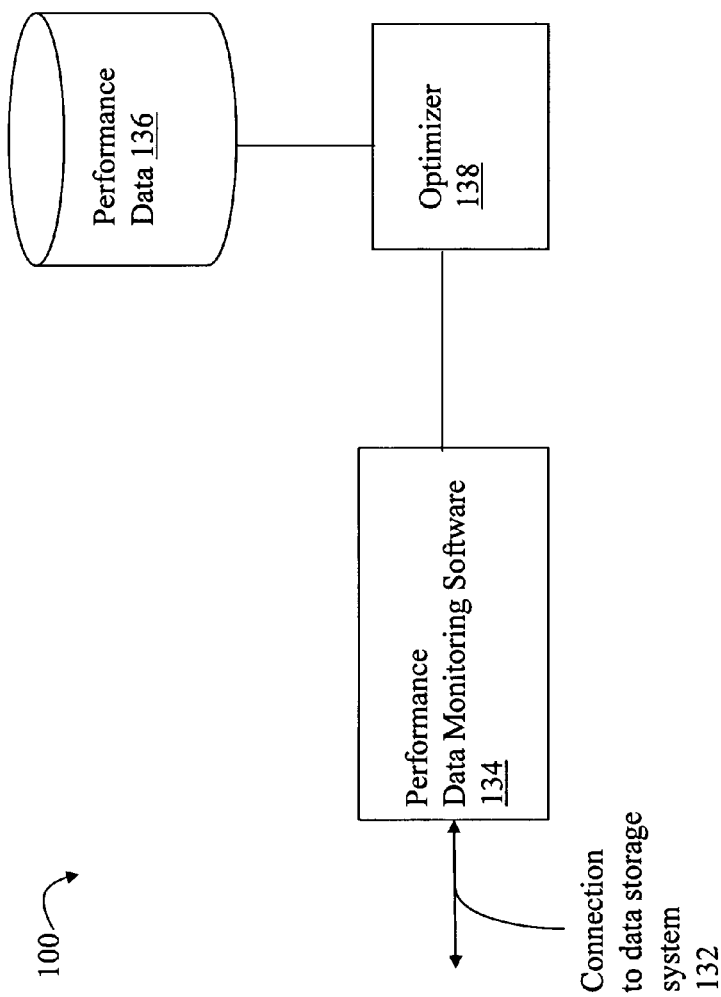
FIG. 3 is an example representing components that may be included in a service processor in an embodiment in accordance with techniques herein.

Referring to FIG. 3, shown is an example 100 of software that may be included in a service processor such as 22a. It should be noted that the service processor may be any one of a variety of commercially available processors, such as an Intel-based processor, and the like. Although what is described herein shows details of software that may reside in the service processor 22a, all or portions of the illustrated components may also reside elsewhere such as, for example, on any of the host systems 14a-14n.

Included in the service processor 22a is performance data monitoring software 134 which gathers performance data about the data storage system 12 through the connection 132. The performance data monitoring software 134 gathers and stores performance data and forwards this to the optimizer 138 which further stores the data in the performance data file 136. This performance data 136 may also serve as an input to the optimizer 138 which attempts to enhance the performance of I/O operations, such as those I/O operations associated with data storage devices 16a-16n of the system 12. The optimizer 138 may take into consideration various types of parameters and performance data 136 in an attempt to optimize particular metrics associated with performance of the data storage system 12. The performance data 36 may be used by the optimizer to determine metrics described and used in connection with techniques herein. The optimizer may access the performance data, for example, collected for a plurality of LVs when performing a data storage optimization. In connection with the techniques herein, the optimizer 38 may perform processing to determine what data, such as of which LVs, to store on physical devices of a particular tier, evaluate when to migrate or move data between tiers, and the like. It should be noted that the optimizer 138 may generally represent one or more components that perform processing as described herein as well as one or more other optimizations and other processing that may be performed in an embodiment.

Described in following paragraphs are techniques that may be performed to determine which one or more LVs to store on physical devices of a particular tier in a multi-tiered storage environment. Data of an LV may be automatically placed in a storage tier where the techniques herein have determined the storage tier is best to service that data in order to improve data storage system performance. The data of the LV may also be automatically relocated or migrated to a different storage tier as the work load and observed performance characteristics for the LV change over time. In accordance with techniques herein, analysis of performance data for a plurality of LVs may be performed in order to determine whether a particular LV's data should be located in a particular storage tier. The techniques herein may take into account how "busy" an LV is and the particular characteristics associated with a storage tier in order to evaluate which LV's data to store on drives of the storage tier. For example, the techniques herein may consider characteristics associated with flash drives of a tier and determine which LVs to locate within that tier.

As an example, the techniques herein may be described with reference to a storage environment having three storage tiers—a first tier of SSD drives in the data storage system, a second tier of non-SSD drives, and a third tier of non-SSD drives. For example, the third tier may include only SATA drives, the second tier may include only FC drives, and the first tier may include only flash drives. The first tier in this example may also be characterized as a flash-based tier (e.g., tier of flash drives) and the second and third tiers may also be characterized as non-flash based tiers. The non-flash based tiers may include drives based on a technology other than flash having lower performance characteristics (e.g., longer latency times, capable of less I/O throughput/second, and the like) than flash drives. Generally, different types of drives have different types of characteristics. There are different reasons why one may want to use one storage tier and type of drive over another depending on goals and the current performance characteristics exhibited in connection with performing I/O operations. In this example, the first tier of flash drives may be characterized as cost effective in terms of performance for data access and retrieval. The third tier of SATA drives may be characterized as cost effective in terms of storage capacity. For example, flash drives of the first tier may be a best choice for storing LVs which may be characterized as I/O intensive or "busy" thereby experiencing a high rate of I/Os to frequently access the physical storage device containing the LV's data. However, flash drives tend to be expensive in terms of storage capacity. SATA drives may be a best choice for storing LVs requiring a large storage capacity and which are not I/O intensive with respect to access and retrieval from the physical storage device. The second tier of FC drives may be characterized as "in between" flash drives and SATA drives in terms of cost/GB and I/O performance. Thus, in terms of relative performance characteristics, flash drives may be characterized as having higher performance than both FC and SATA, and FC may be characterized as having a higher performance than SATA.

As may be observed with respect to data storage systems, a typical or general usage characteristic is that a small amount of the storage capacity tends to be associated with a large amount of the I/O activity, such as read and write operations. For example, 80% of all I/Os may be associated with 20% of the total storage capacity. Since flash drives of the first tier are the most expensive of all tiers in terms of dollars/GB, processing may be performed to determine which of the LVs are characterized as most I/O intensive and therefore may be good candidates to have their data stored on flash drives. Similarly, the second most I/O intensive LVs may be good candidates to store on FC drives of the second tier and the least I/O intensive LVs may be good candidates to store on SATA drives of the third tier. As such, some measure of I/O intensity, performance or activity of each LV may be used as a factor in determining an appropriate storage tier for storing the LV's data.

As mentioned above, flash drives have advantages over other non-flash drives. One advantage is that a flash drive may be characterized as having a relatively low latency such as associated with retrieving requested data on the physical drive. The foregoing time is low relative to latency associated with disk drives such as SATA and FC drives. For example, under similar conditions, it may take 12-14 ms. (milliseconds) to retrieve data from a SATA drive, 6-8 ms. to retrieve data from an FC drive, and generally less than 1 ms. or about 400 microseconds to retrieve data from a flash drive. Another advantage is that flash drives may be characterized as having a relatively high I/O throughput such as a large number of I/O operations per second (IOPs) relative to non-flash drives. For example, under similar conditions, a SATA drive may have a throughput of 150 IOPs, a 15K RPM FC drive may have a throughput of 500 IOPs and a flash drive may have a throughput of 20,000 or more IOPs. In accordance with techniques herein, an embodiment may consider maximizing I/O throughput as a factor or goal when evaluating what one or more LVs should have their data reside in flash drives of the first storage tier.

In connection with latency times, it should be noted that there can be both read latencies and write latencies associated, respectively, with read requests and write requests. In connection with an embodiment that performs processing as described above for write processing and also for read processing, read latency may be considered as a more important factor or characteristic than write latency. As described above for write operations, data may be first written to cache and then out to the physical storage device. From the host or requesting application's perspective, the write may be considered complete once written to cache. Thus, from the host or requester's perspective, time to complete the write operation does not include the time to physically access the storage device and write out the data from cache to the physical drive. However, for read operations, a determination is made as to whether the requested data is in cache and if so, there is a cache hit and the data is returned to the host. Otherwise, there is a read miss (cache miss for a read request). For read misses, the data is read from the physical storage device and then returned to the requester. Thus, before the request can be serviced, the data must be retrieved from the physical storage device. To the requester, the read is not complete until the data is retrieved and returned for the read. Thus, from the host or other requester's perspective, the time to complete the read operation when there is a read miss includes the time it takes to retrieve the requested data from physical storage. In accordance with techniques herein, an embodiment may consider improving or minimizing read miss latency to decrease the overall time the application waits for the read request to be completed. The foregoing may be a factor or goal when evaluating what one or more LVs should have their data reside in flash drives of the first storage tier.

In connection with flash drives, there are also characteristics that may be considered disadvantages. For example, as described above, flash drives tend to exhibit low latency and high I/O throughput relative to the other storage tiers of non-flash drives such as disk drives. However, the relative performance benefits provided by flash drives over non-flash drives, such as SATA and FC disk drives, for both latency and I/O throughput tend to decrease as the number of writes increases. In other words, the greatest difference in performance of flash drives over such non-flash drives for both latency and I/O throughput may be observed if the I/O operations are all reads. As the number of writes in combination with reads increases, latency time tends to increase and I/O throughput tends to decrease. The foregoing is due to the internal processing within the flash drives in connection with writes. Therefore, as more writes are added to the mix of operations for the flash drive, drive performance tends to degrade in that the overall I/O throughput decreases and the overall latency increases. In accordance with techniques herein, an embodiment may consider minimizing the writes to the flash drive based on the above and also other considerations, such as wear out that occurs in connection with writes to flash drives. The foregoing may be a factor or goal when evaluating what one or more LVs should have their data reside in flash drives of the first storage tier.

In accordance with techniques herein, an embodiment may attempt to increase I/O throughput, decrease or minimize read miss latency, and also minimize writes to flash drives due to current flash drive technology implementation. It should be noted that consideration of this third or last factor of minimizing writes may vary and be dependent upon internal characteristics of the flash drives. Flash device technology, or more generally SSD-based technology, may be utilized in an embodiment in which this third factor may not be relevant.

In following paragraphs, different metrics are described which may use performance data observed for LVs. Such performance data may be obtained as described in connection with FIG. 3 by monitoring and recording one or more aspects of I/O activity for each LV. For example, for each LV, an average number of reads occurring within a given time period may be determined, an average number of writes occurring within a given time period may be determined, an average number of read misses occurring within a given time period may be determined, and the like. It should be noted that the operations of read and write with respect to an LV may be viewed as read and write requests or commands from the DA, controller or other backend physical device interface. Thus, these are operations may also be characterized as a average number of operations with respect to the physical storage device (e.g., average number of physical device reads, writes, and the like, based on physical device accesses). This is in contrast to observing or counting a number of particular type of I/O requests (e.g., reads or writes) as issued from the host and received by a front end component such as an FA. To illustrate, a host read request may not result in a read request or command issued to the DA if there is a cache hit and the requested data is in cache. The host read request results in a read request or command issued to the DA to retrieve data from the physical drive only if there is a read miss. Furthermore, when writing data of a received host I/O request to the physical device, the host write request may result in multiple reads and/or writes by the DA in addition to writing out the host or user data of the request. For example, if the data storage system implements a RAID data protection technique, such as RAID-5, additional reads and writes may be performed such as in connection with writing out additional parity information for the user data. Thus, observed numbers of reads and writes as described below and used in connection with following metrics may refer to the read and write requests or commands performed by the DA. Such read and write commands may correspond, respectively, to physical device accesses such as disk reads and writes that may result from a host I/O request received by an FA.

In connection with techniques herein, an embodiment may consider the read miss density (RMD, or average read miss density) for each LV, or more generally, each device used in connection with techniques herein. The RMD for device i, denoted RMDi, may be defined as $$\frac{\text{average number of read misses/second for device } i}{\text{device capacity for device } i} \qquad \text{EQUATION 1}$$

where "device capacity" is the storage capacity of the device such as in GBs. The average number of read misses/second for a device or LV "i" (also denoted "RM i"), may be determined with respect to a defined period of time, using a selected portion of observed data, and the like. A read miss is as described above and refers to a cache miss in connection with servicing a read request from a host or other requester. As an example, LV A may have an average of 100 read misses/second and a storage capacity of 2 GB. Based on the above EQUATION 1, LV A has an RMD of 50 read misses/second for each GB of storage. LV B may have an average of 100 read misses/second and a storage capacity of 100 GB. Based on EQUATION 1, LV B has a read miss density of 1 read miss/second for each GB of storage. Thus, in terms of priority, an embodiment in accordance with techniques herein may consider storing data of LVA to a flash drive of the first tier prior to data for LVB depending on the amount of flash drive storage capacity in the data storage system. Based on EQUATION 1, more benefit to the data storage system may be obtained by locating LV A in the first storage tier of flash drives than by locating LV B in the first storage tier of flash drives. The overall read miss density for the flash drives of the first storage tier is larger if LVA's data is stored thereon rather than LVB's data. Thus, EQUATION 1 expresses a metric that may be used in connection with a performance goal to maximize the read miss density for data stored on flash drives.

In connection with techniques herein, an embodiment may consider the write percentage or ratio for each LV, or more generally, each device. The write percentage or ratio of device i, denoted Wi, may be defined as $$Wi = wi/(ri+wi) \qquad \text{EQUATION 2}$$

where "ri" is the average number of read I/Os per second as may be observed for device i, and "wi" is the average number of write I/Os per second as may be observed for device i.

As noted elsewhere herein, 'ri" may also be characterized as an average number of physical device reads/second and "wi" may also be characterized as an average number of physical device writes/second such as performed by the DA servicing the physical device.

A read percentage or ratio for each LV, or more generally, each device may be similarly defined. The read percentage or ratio of device i, denoted Ri, may be defined as $$Ri = ri/(ri+wi) \qquad \text{EQUATION 3}$$

where "ri" is the average number of read I/Os per second as may be observed for device i, and "wi" is the average number of write I/Os per second as may be observed for device i.

Note that "ri" and "wi" of EQUATION 3 refers to the same items as described in connection with EQUATION 2.

An embodiment in accordance with techniques herein may also weight each Wi where the weighting may be characterized as a cost which is a function of, or varies with, Wi. The weighting or cost, Ci, for an LV or device "i" may be represented as:

$$Ci = f(Wi) \qquad \text{EQUATION 4}$$

where Wi is as determined in EQUATION 2. The cost Ci may be obtained using a characteristic curve that varies with each flash drive architecture. The flash drive architecture may vary with one or more aspects internal to the flash drive (e.g., as may vary with the particulars of how the flash drive is implemented). For example, each flash drive architecture may use varying queue sizes, any one of a variety of different implementation algorithms such as in connection with locating available or unused storage, when performing processing to erase the dirty physical locations through garbage collection and for data consolidation processing, and the like. The flash drive architecture may vary with vendor, manufacturer, and the like and thus the characteristic curve used in connection with techniques herein for determining Ci values may also vary.

Figure 4:
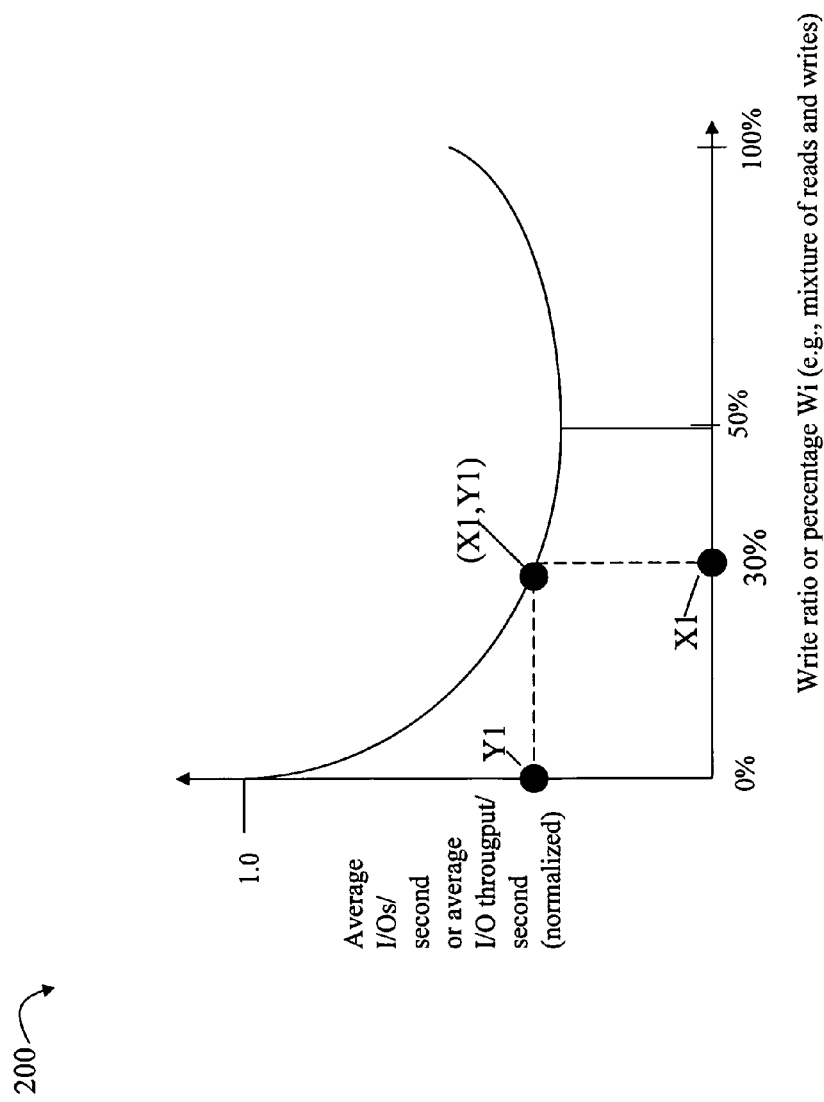
FIG. 4 is a graphical illustration of a characteristics curve that may be used in an embodiment in accordance with techniques herein.

Referring to FIG. 4. shown is an example graphically illustrating a general shape of a characteristic curve of a flash drive that may be used in an embodiment in accordance with techniques herein. The curve of 200 may be used in determining a corresponding cost Ci for a particular Wi. The curve of FIG. 4 may be obtained by attaching a flash drive directly to a host or server and measuring a number of observed I/Os as the percentage or mixture of read and write operations are varied. As flash drive architectural aspects vary, so may the curve of 200.

In the example 200, the X axis may represent different values of the percentage or mixture of read and writes expressed as Wi based on EQUATION 2 above. The Y axis may represent a normalized range of values for the average number of I/Os processed per second (e.g., average I/O throughput per second) as observed or measured for different values of Wi. To obtain a characteristic curve, different values of Wi (X-axis values) may be selected (e.g. based on different selected mixtures of read and writes). For each such Wi, the average number of I/Os completed per second may be determined such as by observation and data gathering. Thus, a point in the curve of 200 may represent a pair of values "X, Y", where X is a selected Wi and Y is a corresponding average number of I/O operations processed per second. Once a specified number of points of the curve have been obtained, other techniques such as linear interpolation, curve fitting techniques, and the like, may be used to determine other points of the curve. For example, an embodiment may store a table of points obtained through observation as described above. Linear interpolation may be used to obtain other points. Alternatively, an embodiment may use a curve fitting routine in accordance with the observed discrete data points in order to obtain a complete curve as illustrated in FIG. 4.

It should be noted that the values of the Y axis are normalized or scaled to values between 0 and 1.0. The Y axis values may represent the average I/O throughput (e.g., including both reads and writes) measured per second as the mixture of reads and writes is varied (e.g., as Wi varies).

The characteristic curve of 200 represents a normalized cost curve where cost may be expressed as a function of the write ratio Wi (EQUATION 4) as illustrated. Also, the curve may be expressed as a function of the read ratio Ri (EQUATION 3) since Ri=1−Wi and Wi=1−Ri.

To further illustrate, assume we have a device or LV i with a corresponding Wi of 30% as represented by X1 in the example 200. For X=X1, determine a corresponding Y value using the curve as represented by Y1. In this case, Y1 represents the cost or Ci value of EQUATION 4 which may be used in weighting the RMDi (EQUATION 1).

For a given device or LV "i", the RMDi (e.g., from EQUATION 1) may be weighted using the cost Ci (e.g., generally as in EQUATION 4 and having a value as obtained from a curve such as in FIG. 4) and expressed as a score Si as follows:

$$Si = Ci*RMDi \qquad \text{EQUATION 5}$$

An embodiment may further weight the score Si of EQUATION 5 based on a priority Pi that may be associated with each LV or device "i". Each LV may be assigned one of a plurality of priorities. By default, all LVs may have a same priority Pi. The use of priorities or Pi values for LVs provides another level of control or weighting that may be associated with an LV and used as a factor in data storage tier selection (e.g., determining whether data for the LV is stored on a flash drive, or other type of physical storage of another tier). For example, an embodiment may allow user-specified priorities for LVs. In an embodiment using priorities, the score Si of EQUATION 5 may be represented as:

$$Si = Ci*RMDi*Pi \qquad \text{EQUATION 6}$$

It should be noted that whether an embodiment utilizes only a portion of the curve of FIG. 4 may vary with the particular data storage system. For example, RAID-5 data protection may be implemented within a data storage system including the flash drives of a the first storage tier described above. With RAID-5 as described above, extra reads and writes may be performed when writing data for a single host or user write request. In particular, for RAID-5, there may be 2 reads and 2 writes performed by the DA for each host write request in connection with writing the write request data and other associated information (e.g., parity data) necessary for RAID-5 protection. Therefore, an embodiment using SSD drives in a data storage system that implements such RAID-5 data protection may choose to only utilize a portion of characteristic curve data corresponding to X-axis values ranging from 0% to 50%, inclusively. When the host does 100% writes to a flash drive, the data storage system implementing RAID-5 data protection is actually doing 50% reads and 50% writes. Thus, points on the curve having corresponding X-axis (Wi) values greater than 50% are not relevant to the DA, controller, or other backend component in an embodiment in which the data storage system implements RAID-5 data protection. Recall that we want to consider the reads and write (e.g., mixture of reads and writes) as done by the back-end DA. Since the curve may be obtained by connecting an SSD drive to host and observing host I/Os, one may only use a relevant portion of the curve in order to use cost values reflecting the reads and writes to the physical drive in accordance with the back end or DA's view point.

Generally, the portion of the characteristic curve used may vary, for example, with any additional data operations (reads and/or writes) that may be performed by the data storage system in connection with implementing a particular data protection scheme when writing the host or user data.

Based on the above, what will now be described is processing that may be performed in an embodiment in accordance with techniques herein to evaluate what data to place on physical devices of a first tier, such as including flash devices, and what data to place on physical devices of one or more other tiers. The processing may be performed to automatically place data of an LV within a storage tier selected as part of this evaluation. In connection with exemplary processing in following paragraphs, the first storage tier may include flash drives. There may also be one or more other storage tiers which include other non-flash drives, such as FC and/or SATA disk drives.

Figure 5:
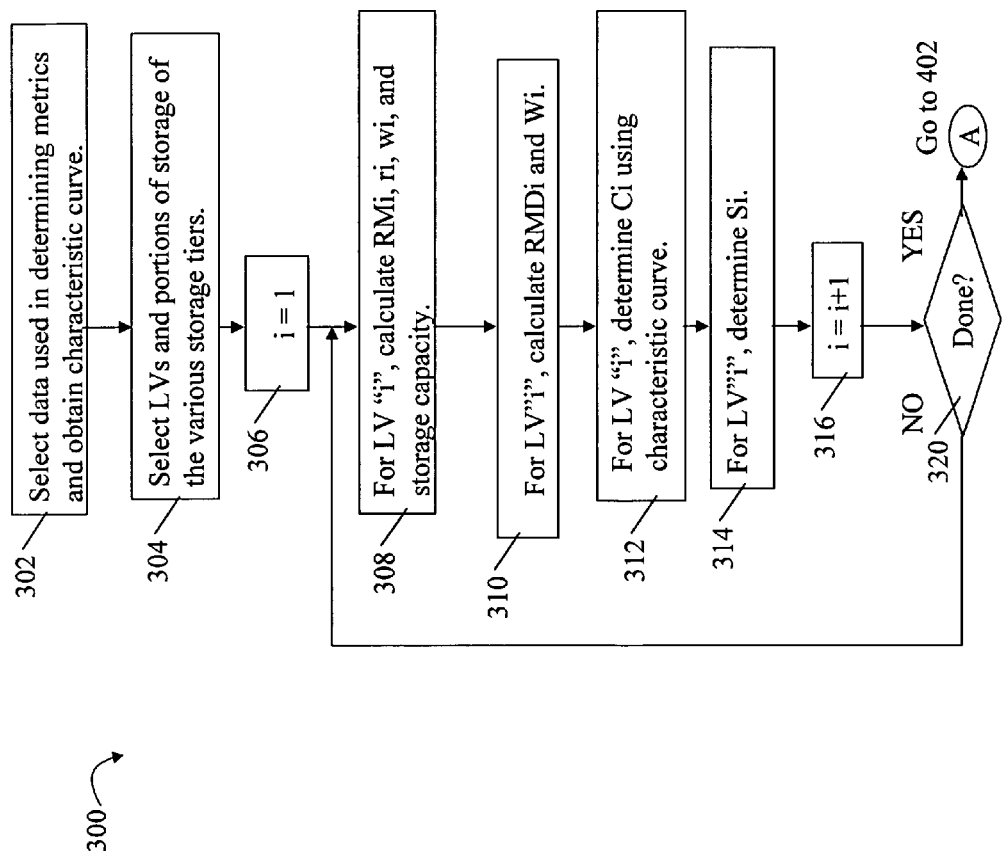
FIGS. 5, 6, and 10 are flowcharts of processing steps that may be performed in an embodiment in accordance with techniques herein.
Figure 6:
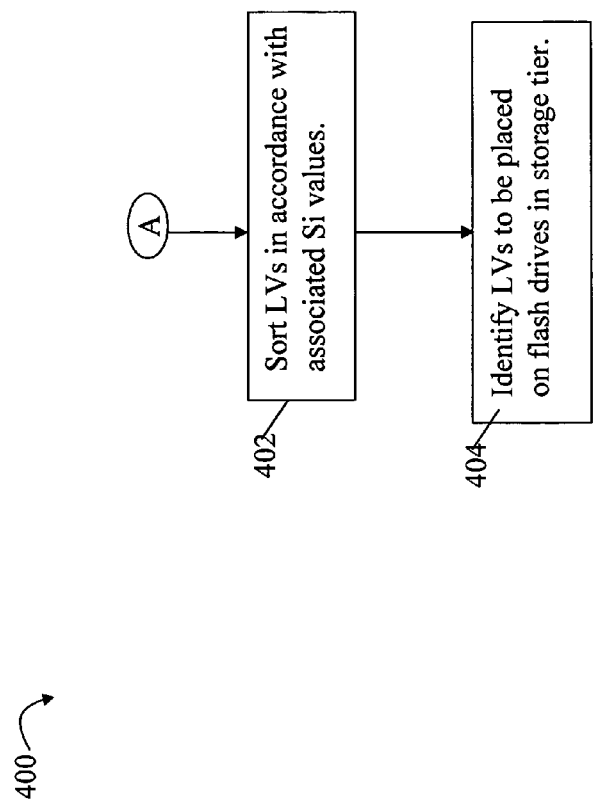

Referring to FIGS. 5 and 6, shown are flowcharts of processing steps that may be performed in an embodiment in accordance with techniques herein. The processing of FIGS. 5 and 6 may be executed as a background process and may be performed periodically such as, for example, by the optimizer of FIG. 3 to evaluate what LVs should be located in the first storage tier of flash drives. Such processing may also be performed at other times, for example, such as in response to a user initiated action, in response to a detected event, and the like.

At step 302, data used in subsequent processing steps may be selected. Such selection may include, for example, a user defined time period or window. Performance data, such as described in connection of FIG. 3, may be analyzed with respect to the defined time period in order to determine various values, such as average number of read misses per LV/second, used in subsequent processing steps. Exemplary time periods may be a number of hours, weeks, days, and the like. Any required metrics may be determined by examining collected performance data looking back in time within the time period Selection of data used may also include identifying data to be excluded. For example, a user may identify one or more portions of collected data not to be used since such excluded data is deemed not relevant for the analysis. For example, if backups are performed on weekends, the user may select to ignore such data collected during the weekends since the data collected for this time period may not reflect typical device activity. An embodiment may use any suitable technique for selection of performance data used in the analysis and techniques herein.

Step 302 may also include obtaining the characteristic curve for the particular flash devices included in the first storage tier. An example illustration of the characteristic curve is illustrated in FIG. 4.

At step 304, the LVs being evaluated for placement in one of the storage tiers are selected. It should be noted that this may include all LVs or a portion thereof. Additionally, an embodiment may use all available storage in all storage tiers for use with the selected LVs or may otherwise specify an amount of storage in each of the various storage tiers for use with the selected LVs. For example, a group of LVs associated with a particular application's data may be specified. Additionally, an amount of storage, or storage capacity, allocated for use by the application may be specified for each of one or more storage tiers. The techniques herein may then be used to automatically determine which LVs are located on flash drives of the first tier and which LVs are located on non-flash drives of one or more other tiers. The one or more other non-flash based tiers may have lower performance characteristics than the first tier. The techniques herein may be used to generally determine which LVs have their data stored on flash drives and which LVs have their data storage on non-flash drives. The non-flash drives may be included in one or more other storage tiers. In an embodiment in which there are two or more tiers of non-flash drives, other techniques may be used to determine which of the two tiers to store LV data on. For example, an embodiment may include three tiers—a first tier of all flash drives, a second tier of FC drives and a third tier of SATA drives. The techniques herein may be used to determine which LVs have their data storage in the first tier. As described in more detail elsewhere herein, an embodiment may use a variety of other suitable techniques known in the art to determine whether to store each LV's data in the second tier on an FC drive or in the third tier on a SATA drive.

At step 306, a loop control variable, i, is initialized to the first LV selected in step 304. Processing of steps 308, 310, 312, 314, and 316 may be performed for each selected LV of step 304. The variable "i" is used to denote the current loop iteration and LV for which processing is performed. At step 308, for LVi, a first set of values is calculated. Step 308 includes calculating a first of values—RMi, ri, wi and the storage capacity for LVi. The values calculated in step 308 may be determined using the data selected in step 302. At step 310, for LVi, a second set of values is calculated. Step 310 includes calculating RMDi (EQUATION 1) and Wi (EQUATION 2). As described above, determination of the RMDi and Wi uses values determined in step 308. At step 312, for LVi, determine Ci using the characteristic curve. At step 314, for LVi, calculate Si (EQUATIONS 6 and 7). As described above, determination of Si uses values determined in steps 310 and 312. At step 316, i is incremented to identify the next selected LV. At step 320, a determination is made as to whether processing has been completed for all LVs. If not, control proceeds to step 308 to process the next LV. If step 320 evaluates to yes, control proceeds to step 402 of FIG. 6. At step 402, the selected list of LVs is sorted based on their associated Si values. In step 402, the Si values of the selected LVs may be sorted in descending order. In step 404, the LVs to be placed on flash drives of the first storage tier may be identified in accordance with the sorted LV list of step 402. The descending order of the sorted LV list may denote a ranking or ordering in which the LVs are candidates for placement in the first storage tier. A first LV having a higher ranking or score than a second LV is placed in the first storage tier prior to the second LV. The number of LVs placed in the first storage tier may depend on the storage capacity designated for use with the selected LVs. An embodiment may start storing data of the LVs on flash drives of the first storage tier beginning at the top of the sorted LV list until the designated storage capacity has been utilized. For example, there may be 3 LVs evaluated for storage tier placement where each LV may have a storage capacity of 10 GB. Step 403 may result in a sorted LV list of A, B, C. There may only be 20 GB of flash drive storage in the first tier so LV A and LV B may be placed in the first tier and accordingly have their data located on flash drives of the first tier. For those LVs which are identified for placement in the first storage tier and which currently do not have data located on devices of the first tier, such data needs to be migrated to devices of the first tier. The data of an LV may be placed on a flash device of the first tier, for, example, by determining currently unused storage in the flash device of a sufficient size. If there is an insufficient amount of unused storage in the flash device, existing data currently located on the flash device may be displaced or moved to another storage tier. For example, assume LV C and LV A are currently located on a flash device of the first tier and processing determines that LV A and LV B should be located in the first tier. LV B's data may copied to the storage location on the flash device currently occupied by LV C's data. Data of LV C may be relocated to another non-flash device of another storage tier.

As described above, determining where to locate data within a selected tier may include determining free or unused storage device locations within the selected tier. In the event there is an insufficient amount of free of unused storage, processing may also include displacing or relocating other data currently stored on a physical device of a selected tier. A embodiment may perform movement of data to and/or from physical storage devices using any suitable technique. Also, any suitable technique may be used to determine a target storage device and target tier for any data currently stored on a device of a tier where the data is relocated or migrated to the target tier. An embodiment may use, for example, the techniques described in U.S. patent application Ser. No. 12/586, 925, filed Sep. 29, 2009, TECHNIQUES FOR PERFORMING DATA MIGRATION, which is incorporated by reference herein. An embodiment may also use other techniques in addition to that described herein to evaluate the cost-benefit of any data movement, migration, swap, and the like.

It should be noted that although the techniques herein are illustrated with respect to selecting storage tiers for LVs, the techniques herein may be more generally used with selecting a storage tier for any data unit or entity. For example, an embodiment may utilize metavolumes or metadevices which may be characterized as a logical volume comprising one or more other logical volumes. For example, a metavolume or metadevice may be defined which includes multiple LVs— LV A, LV B and LV C. A host or other consumer of the metadevice may view the multiple LVs as a single metadevice rather than three single LVs. In such an embodiment, the techniques herein may consider the metadevice as a single atomic data unit or entity when performing evaluation and processing (e.g., metadevice considered as a single device on the list of selected devices in step 304).

In connection with techniques herein, promotion may refer generally to movement of an LV from a first storage tier to a second storage tier where the second storage tier is characterized as having devices of higher performance than devices of the first storage tier. The performance of a tier may be expressed in terms of one or more attributes of devices in the tier as described above such as, for example, related to latency time, I/O throughput, and the like. As such, movement of an LV from a first tier of FC devices to a second tier of flash devices may be characterized as promoting the LV. Demotion may refer generally to movement of an LV from a first storage tier to a second storage tier where the first storage tier is characterized as having devices of higher performance than devices of the second storage tier. As such, movement of an LV from a first tier of flash devices to a second tier of FC devices and/or SATA devices may be characterized as demoting the LV. In connection with one embodiment in accordance with techniques herein, promotion may refer to movement of an LV from a non-flash based tier (where there may be one or more non-flash based tiers of lower performance devices) to a flash-based tier. Demotion may refer to movement of an LV from a flash-based tier to a non-flash-based tier (where there may be one or more non-flash based tiers of devices having lower performance than the flash-based tier).

An embodiment may use a variety of different techniques in order to avoid thrashing where an LV may be repetitively demoted from a tier, such as including flash drives, and then promoted to the tier. Over a period of time, the foregoing successive demotion and promotion with respect to a flash-based tier may occur many times. The cost of thrashing in terms of using data system resources (e.g., such as for data movement between tiers) may not be worth any measured benefit to the data storage system performance.

Figure 7:
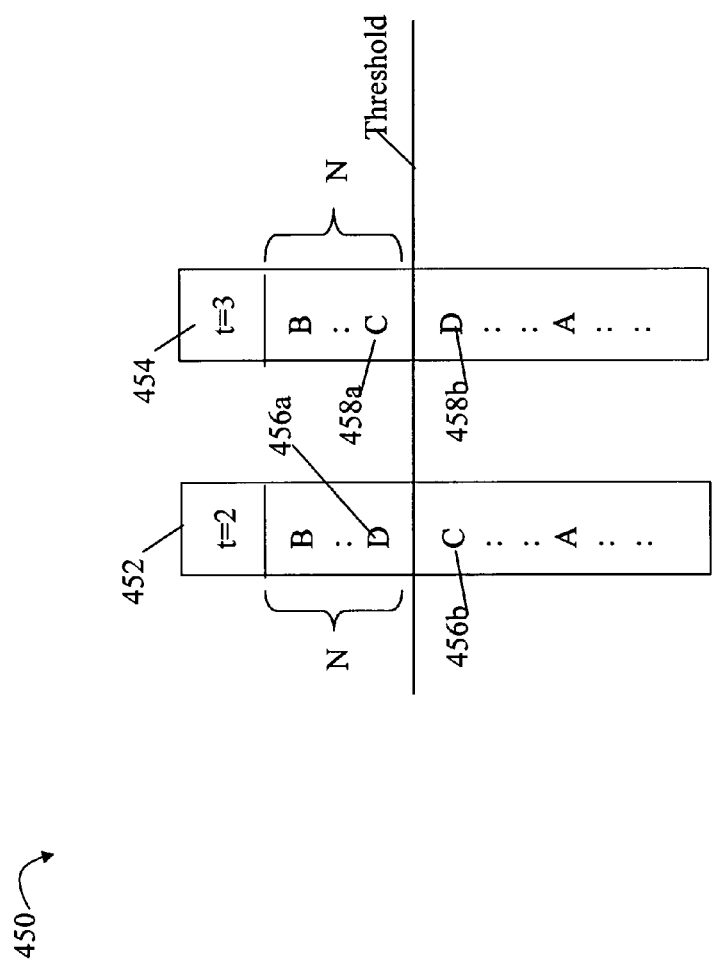
FIGS. 7, 8 and 9 are examples illustrating use of thresholds in an embodiment in accordance with techniques herein.

To illustrate, reference is made to FIG. 7 of an example 450. In the example 450, 452 and 454 may represent two sorted LV lists at respective times t=2 and t=3, where each of the lists is sorted based on descending Si values. Each of 452 and 454 may be produced as a result of step 402 of FIG. 6. N may represent a threshold or total storage capacity in bytes of a first tier of flash devices so that all LVs in the lists 454, 454 above the threshold line are stored on devices of the first tier. At time t=2, all LVs in the list above the threshold line may be placed on flash devices in the first tier and those LVs below the threshold line are placed on devices in a second tier of non-flash devices. At time t=3, all LVs in the list above the threshold line may be placed on flash devices in the first tier and those LVs below the threshold line are placed on devices in a second tier of lower performing non-flash devices. It is noted that at time t=2, LV D (456*a*) is above the threshold and placed on a flash drive of the first tier and LV C (456*b*) is below the threshold and placed on a lower performing non-flash drive of a second tier. At time t=3, performance data of LV C indicates that LV C is now slightly busier than LV D. As a result, at time t=3, LVs C and D have swapped positions with respect to the previous list 452 from t=2. In 454, LV C (458*a*) is above the threshold and placed on a flash drive of the first tier and LV D (458*b*) is below the threshold and placed on a lower performing non-flash drive of the second tier. At processing may be performed to move data of LVs C and D between storage tiers when the performance of both LVs may not have actually varied much at all from time t=2 to t=3. In other words, the cost in terms of resources utilized to relocate the data of LVs C and D may not result in any worthwhile benefit or gain in data storage system performance.

To assist in reducing thrashing, an embodiment may use any one or more techniques. One such technique that may be used will now be described.

Figure 8:
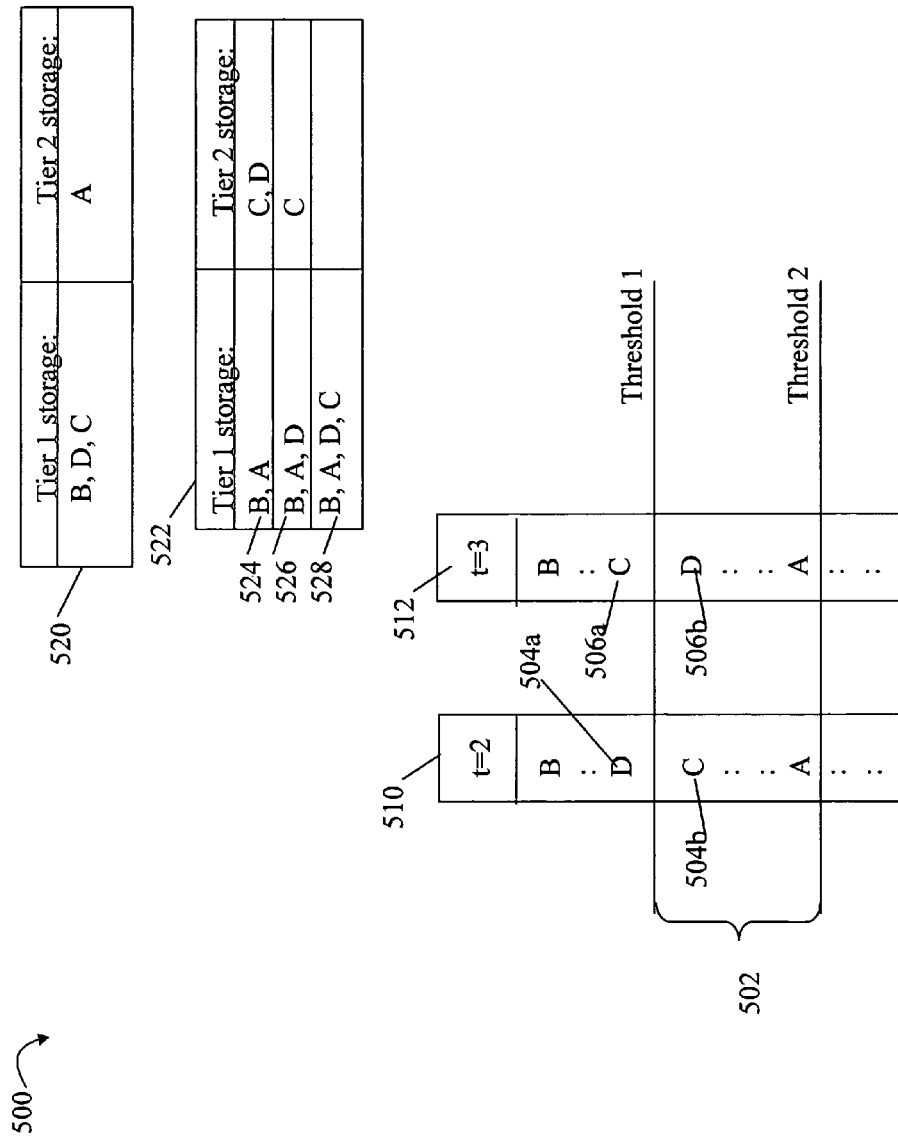

Referring to FIG. 8, shown are examples illustrating use of two thresholds in an embodiment in accordance with techniques herein to reduce thrashing. In 500, elements 510 and 512 may represent sorted LV lists (e.g., 452, 454) as described above in connection with FIG. 7. In connection the LV lists 510 and 512, two thresholds may be specified. There may be two storage tiers—tier 1 including flash drives and tier 2 including lower performing non-flash based drives such as FC and/or SATA disk drives. Although only two tiers are illustrated, an embodiment may include more that two tiers. For example, there may be two or more non-flash based tiers having lower performance characteristics than tier 1 of flash drives. As such, the techniques described in connection with FIG. 8 may be used to reduce thrashing with respect to cross tier data movement between the flash-based tier and any one of the non-flash based tiers. In the event that an LV, for example, is demoted to a non-flash based tier and there are multiple such non-flash based tiers, an embodiment may use any one of a variety of suitable techniques to select one of the non-flash based tiers for placement of the demoted LV.

For each of the lists 510, 512, those LVs located above threshold 1 position may be promoted to flash devices of tier 1 if those LVs are not already stored on tier1 devices. Those LVs located below threshold 2 position may be demoted from flash devices of tier 1 if those LVs are currently located on tier 1 devices. Those LVs in one of the lists 510, 512 positioned between threshold1 and threshold 2 (as denoted by 502) may remain stationary in whichever of the two storage tiers they are located. In other words, 502 may represent a stationary zone of list positions where LVs in 502 are neither demoted nor promoted with respect to tier1 storage. In order to be promoted to tier1 storage, the LV must be in a list position above threshold 1. In order to be demoted from tier 1 storage, the LV must be in a list position below threshold 2. For simplicity in connection with following examples, it is assumed that there is sufficient unused storage in each tier to perform the indicated data movements.

In connection with a first example, element 520 may represent which LVs in the list 510 are included in tier 1 flash devices and tier 2 FC devices at time t=1 prior to relocating any LV data across tiers in accordance with the list 510. Element 520 indicates that LVs B, D, and C are located on tier 1 devices and LV A is located on a tier 2 device. It should be noted additional LVs may also be located in the two tiers other than those LVs A-D illustrated in 520. At time t=2, the list 510 may be generated as a result of performing processing of FIGS. 5 and 6. No LV data of 520 is relocated in accordance with the list 510. LVs B and D above threshold 1 are already in tier 1 storage. LVs A and C are not relocated to a different tier because they are located in positions between threshold 1 and threshold 2. At time t=3, the list 512 may be generated. As with the list 510, no LV data of 520 is relocated in accordance with the list 512. LVs B and C above threshold 1 are already in tier 1 storage. LVs A and D are not relocated to a different tier because they are located between threshold 1 and threshold 2.

In connection with a second example, element 524 may represent which LVs in the list 510 are included in tier 1 flash devices and tier 2 FC devices at time t=1 prior to relocating any LV data across tiers in accordance with the list 510. Element 524 indicates that LVs B and A are located on tier 1 devices and LVs C and D are located on tier 2 devices. It should be noted additional LVs may also be located in the two tiers other than those LVs A-D illustrated in 524. At time t=2, the list 510 may be generated as a result of performing processing of FIGS. 5 and 6. LV data of 524 may be relocated in accordance with the list 510 resulting in a state represented by 526. In the list 510, LVs B and D are above threshold 1. B is already in tier 1 storage but D is not so D is accordingly promoted or moved from tier 2 to tier 1 storage. LVs A and C are not relocated to a different tier because they are in positions between threshold 1 and threshold 2.

At time t=3, the list 512 may be generated. LV data of 526 may be relocated in accordance with the list 512 resulting in a state represented by 528. In the list 512, LVs B and C are above threshold 1. B is already in tier 1 storage but C is not so C is accordingly promoted or moved from tier 2 to tier 1 storage. LVs A and D are not relocated (e.g., neither promoted nor demoted) because they are between threshold 1 and threshold 2.

As another technique to avoid thrashing, an embodiment may specify a minimum amount of time that an LV remains in any current physical location prior to data associated with the LV being a candidate to be moved to a different physical location on a device of a same tier and/or a different tier.

Figure 9:
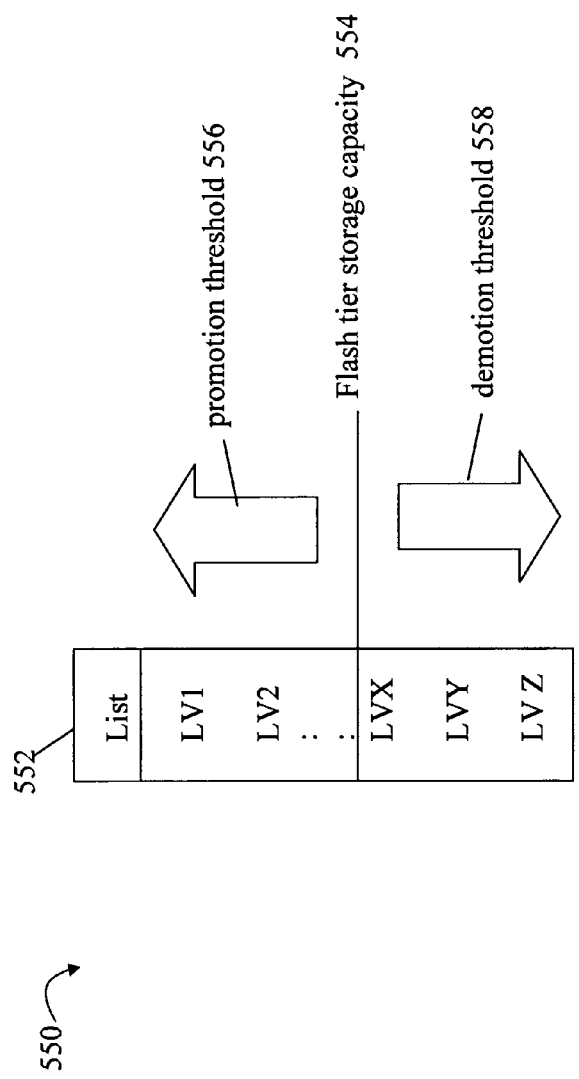

Referring to FIG. 9, shown is an example 550 illustrating selection of thresholds in an embodiment in accordance with techniques herein. Generally, the promotion threshold (denoted by threshold 1 in FIG. 8) selected may correspond to a higher position or ranking in the sorted list than the demotion threshold (denoted as threshold 2 in FIG. 8). The promotion threshold and demotion threshold may be selected in accordance with the capacity of the flash-based storage tier as represented by 554. Element 552 may represent a sorted LV as generated using the processing of FIGS. 5 and 6. Element 554 may represent the partitioning of the list 552 based on the storage capacity threshold of the storage tier of flash drives so that the storage tier of flash drives has the capacity to store data of all LVs in the list above 554. The promotion threshold 556 may correspond to a position in the list 552 which is the same, or higher than, that as represented by 554. The demotion threshold may correspond to a position in the list 552 which is the same as the position represented by 554 or below the position represented by line 554. Each of the thresholds 556 and 558 may also correspond to an amount of storage where 556 has a value equal to or less than the capacity represented by 554, and 558 has a value equal to or greater than the capacity represented by 554. With reference back to FIG. 8, the total storage capacity of the flash-based tier 1 storage may correspond to a position in the lists 510, 512 between threshold 1 and threshold 2. It should be noted that an embodiment may use any one of a variety of different techniques to select values for thresholds 556 and 558.

In one embodiment, the sum of capacities of LVs up to the demotion threshold 558 may be equal to the total storage capacity of the higher performing tier, such as the flash tier. With reference back to FIG. 8, threshold 2 may represent the total storage capacity of the flash tier. The promotion threshold 556 may then be determined based on 558 as a function of 556. In one embodiment, the thresholds 556 and 558 may be specified as score values such as within a range of the scores associated with the ranked LVs. In this case, the first threshold score specified as the demotion threshold is equal to or less than a second threshold score specified as the promotion threshold. For example, a constant factor of 1.2 may be used to calculate the promotion threshold 556 using the demotion threshold 558 (e.g., promotion threshold=1.2* demotion threshold). An embodiment may specify the promotion and demotion thresholds using other values such as, for example, an amount of storage capacity (e.g., a number of GBs). If the promotion and demotion thresholds are specified using storage capacities, it should be noted that the demotion threshold is associated with a first capacity that is equal to or greater than a second capacity associated with the promotion threshold.

Figure 10:
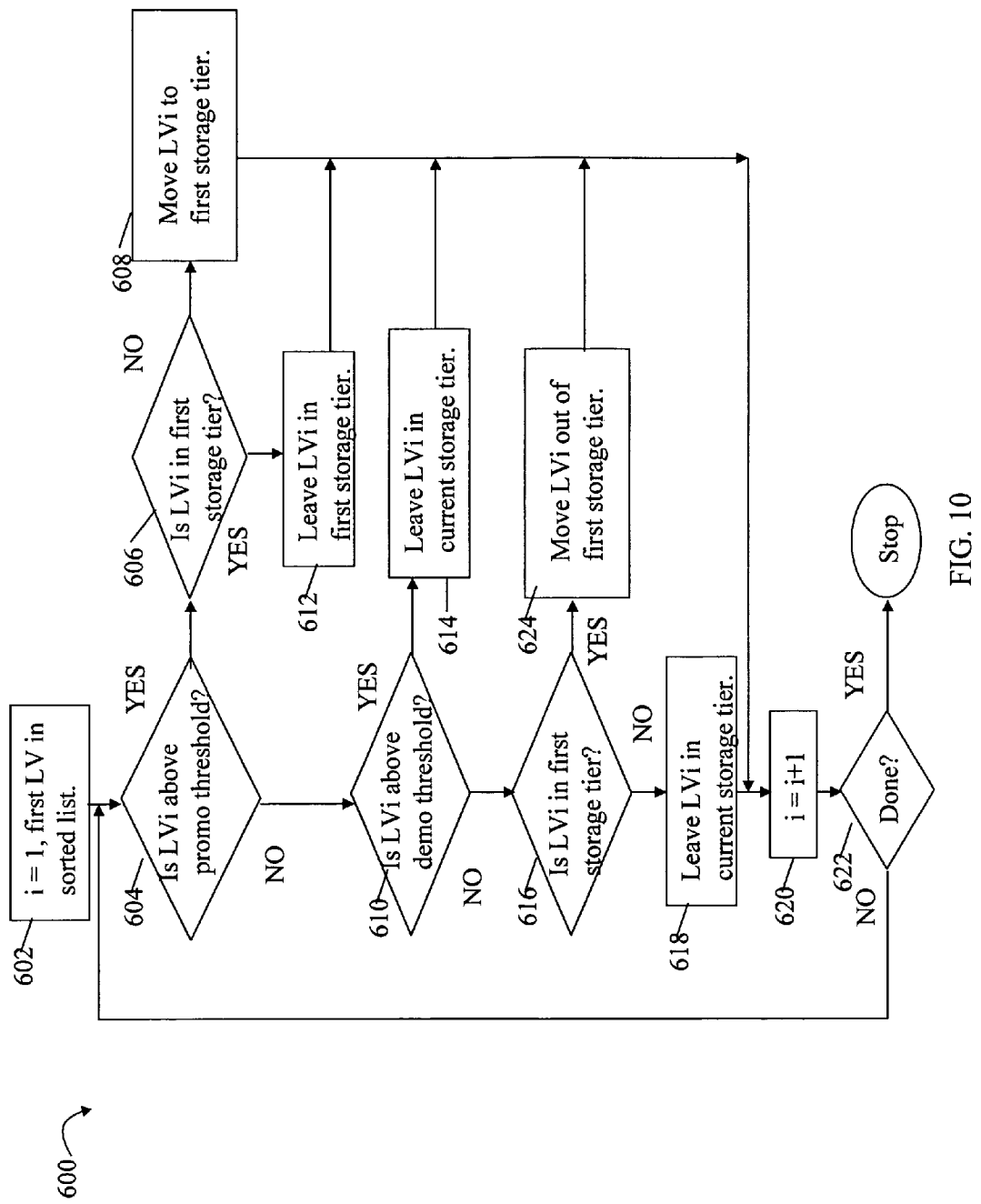

Referring to FIG. 10, shown is a flowchart of processing steps that may be performed in an embodiment in accordance with techniques herein using the demotion and promotion thresholds. The flowchart 600 summarizes processing as described above in connection with the example of FIG. 8. With reference to FIG. 8, the promotion threshold corresponds to threshold1 and the demotion threshold corresponds to threshold2. Processing of 600 may be performed to traverse the sorted list generated as a result of step 402 of FIG. 6 in order to determine whether to leave an LV in its current storage tier, or whether to promote or demote the LV with respect to a first tier of flash devices. The first tier may also be referred to as a flash-based tier of storage. At step 602, a variable, i, is assigned 1 to identify the first LV in the sorted list. At step 604, a determination is made as to whether the current LV, LVi, is above the promotion threshold. If step 604 evaluates to yes, control proceeds to step 606 where a determination is made as to whether data for LVi is currently located in the first storage tier. If step 606 evaluates to no, control proceeds to step 608 to move or relocate LVi to the first storage tier. Control proceeds to step 620. If step 606 evaluates to yes indicating that LVi is already in the first tier, control proceeds to step 612 where the LVi remains in the first tier. Control then proceeds to step 620.

It step 604 evaluates to no, control proceeds to step 610 where a determination is made as to whether LVi is positioned above the demotion threshold. If step 610 evaluates to yes indicating that LVi is in between the promotion and demotion thresholds, control proceeds to step 614 where LVi remains in its current storage tier. Control proceeds to step 620. If step 610 evaluates to no indicating that LVi is located below the demotion threshold, then control proceeds to step 616. At step 616, a determination is made as to whether LVi is currently located in the first storage tier. If step 616 evaluates to yes, control proceeds to step 624 to move or relocate LVi out of the first storage tier to another storage tier. Control proceeds to step 620. If step 616 evaluates to no, control proceeds to step 618 to leave LVi in its current storage tier. Control then proceeds to step 620.

At step 620, the variable i is incremented to identify the next LV in the sorted list. At step 622, a determination is made as to whether all LVs in the sorted list have been processed. If so, processing stops. Otherwise, control proceeds to step 604 to perform processing for the next LV in the sorted list.

Techniques herein may generally be used in connection with inter-tier or data movement across tiers. The tiers may include flash devices and non-flash-based devices (e.g., disk drives) having lower performance characteristics than flash devices. The tiers may also include other types of SSDs besides flash devices. In connection with tiers containing other types of SSDs, the particular metrics and techniques described herein for flash devices may be used alone or in combination with others as may be applicable for the particular characteristics and implementations of the other types of SSDs. Also, as will be appreciated by those skilled in the art, particular metrics, characteristics, and the like, as described herein may also not be applicable for use with certain types of devices. For example, use of the characteristic curve may not be applicable for use with other types of SSDs such as based on a form of RAM.

Data used in connection with techniques herein, such as the performance data of FIG. 3, may be obtained through observation and monitoring actual performance. Data may also be determined in other suitable ways such as, for example, through simulation, estimation, and the like.

One embodiment in accordance with techniques herein may include multiple storage tiers including a first tier of flash devices and one or more other tiers of non-flash devices having lower performance characteristics than flash devices. The one or more other tiers may include, for example, one or more types of disk devices. It should be noted that if other types devices, such as other types of SSDs, are included in the first tier alone, or in combination with flash devices, whether the particular metrics and techniques described herein may be used may vary with applicability and relevance to the other SSDs.

An embodiment in accordance with techniques herein may provide for automated evaluation to determine what data to store on physical devices of particular storage tiers in a multi-tier storage environment. The techniques may make such determinations in accordance with one or more performance goals in order to maximize data storage system performance and utilization of resources. An embodiment in accordance with the techniques herein may also provide for automated movement of data across or between different storage tiers as may be needed based on changing workload in response to the evaluation.

It should be noted that the techniques described herein may be used alone or in combination with other techniques in an embodiment. For example, an embodiment may use the techniques described herein to determine which device's data resides on physical storage of different tiers based on performance goals. Additionally, the embodiment may make such a determination in combination with other goals, restrictions, and the like. For example, an embodiment may use the techniques herein for performing a determination based on performance goals in combination with an allocation policy, such as using techniques described in U.S. patent application Ser. No. 12/803,570, filed on even date herewith, TECHNIQUES FOR DYNAMIC DATA STORAGE CONFIGURATION IN ACCORDANCE WITH AN ALLOCATION POLICY, which is incorporated by reference herein.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for configuring data storage comprising:
selecting a plurality of devices;
determining, for each of said plurality of devices, whether data for said each device should be located in a first storage tier or another storage tier, said first storage tier being a higher performance storage tier than said other storage tier; and
for each of said plurality of devices that said determining determines should be located in the first storage tier, automatically locating data of said each device on a physical storage device of said first storage tier, and wherein said determining whether data for said each device should be located in said first storage tier or another storage tier further comprises:
determining a score for each of said plurality of devices in accordance with a plurality of values for said each device, said plurality of values including a read miss density for said each device, said read miss density being determined by dividing an average number of read misses per unit of time for said each device by a storage capacity of said each device.

2. The method of claim 1, wherein said first storage tier includes one or more flash memory devices and said another storage tier includes one or more physical devices having lower performance characteristics than said one or more flash memory devices.

3. The method of claim 1, wherein said another storage tier is one of a plurality of other storage tiers which are lower performance storage tiers than said first storage tier.

4. The method of claim 2, further comprising:
generating a sorted list of said plurality of devices based on the scores or said plurality of devices, said sorted list being sorted in increasing order.

5. The method of claim 4, further comprising performing first processing for each of said plurality of devices to determine said score for said each device, said first processing including:
calculating said read miss density for said each device;
calculating a write percentage for said each device representing what portion of physical storage accesses for data of said each device are writes;
determining a priority for said each device; and
determining said score for said each device using said read miss density, said write percentage and said priority for said each device.

6. The method of claim 5, wherein said write percentage is used to determine a cost associated with said read miss density.

7. The method of claim 6, wherein said cost represents a normalized value.

8. The method of claim 5, further comprising:
determining a promotion threshold associated with a first position in said sorted list, wherein each device in said sorted list having a position above said first position is moved to said first storage tier if currently included in said another storage tier.

9. The method of claim 8, further comprising:
determining a demotion threshold associated with a second position in said sorted list, wherein each device in said sorted list having a position below said second position is moved from said first storage tier to said another storage tier if currently included in said first storage tier.

10. The method of claim 9, wherein each device in said sorted list having a position between said first position and said second position remains in said first storage tier if currently in said first storage tier and remains in said another storage tier if currently in said another storage tier.

11. The method of claim 1, wherein said plurality of devices are logical volumes.

12. A method for configuring data storage comprising:
selecting a plurality of devices;
determining, for each of said plurality of devices, whether data for said each device should be located in a first storage tier or another storage tier, said first storage tier being a higher performance storage tier than said other storage tier;
for each of said plurality of devices that said determining determines should be located in the first storage tier, automatically locating data of said each device on a physical storage device of said first storage tier, wherein said first storage tier includes one or more flash memory devices and said another storage tier includes one or more physical devices having lower performance characteristics than said one or more flash memory devices;
determining a score for each of said plurality of devices; and
generating a sorted list of said plurality of devices based on the scores for said plurality of devices, said sorted list being sorted in increasing order; and wherein the method further comprises performing first processing for each of said plurality of devices to determine said score for said each device, said first processing including:
calculating a read miss density for said each device representing an average number of read misses per unit of storage for said each device;
calculating a write percentage for said each device representing what portion of physical storage accesses for data of said each device are writes;
determining a priority for said each device; and
determining said score for said each device using said read miss density, said write percentage and said priority for said each device, wherein said write percentage is used to determine a weight for said read miss density.

13. A method for configuring data storage comprising:
selecting a plurality of devices;
determining, for each of said plurality of devices, whether data for said each device should be located in a first storage tier or another storage tier, said first storage tier being a higher performance storage tier than said other storage tier;
for each of said plurality of devices that said determining determines should be located in the first storage tier, automatically locating data of said each device on a physical storage device of said first storage tier, wherein said first storage tier includes one or more flash memory devices and said another storage tier includes one or more physical devices having lower performance characteristics than said one or more flash memory devices;
determining a score for each of said plurality of devices; and
generating a sorted list of said plurality of devices based on the scores for said plurality of devices, said sorted list being sorted in increasing order; and wherein the method further comprises performing first processing for each of said plurality of devices to determine said score for said each device, said first processing including:
calculating a read miss density for said each device representing an average number of read misses per unit of storage for said each device;
calculating a write percentage for said each device representing what portion of physical storage accesses for data of said each device are writes;
determining a priority for said each device; and
determining said score for said each device using said read miss density, said write percentage and said priority for said each device, wherein said write percentage is used to determine a cost associated with said read miss density, and wherein said cost is determined using a characteristic curve for said one or more flash devices, said characteristic curve indicating an average I/O throughput as a function of write percentage.

14. The method of claim 13, further comprising
receiving a threshold capacity indicating an amount of storage in said first storage tier; and
storing data for a first portion of said plurality of devices on physical devices of said first storage tier, wherein said total storage capacity of said first portion does not exceed said threshold capacity, each device in said first portion having a score determined using said first processing which is greater than or equal to each score determined using said first processing for each of said plurality of devices not included in said first portion.

15. A non-transitory computer readable medium comprising code stored thereon for configuring data storage, the non-transitory computer readable medium comprising code which, when executed, performs processing including:

selecting a plurality of logical volumes having data stored on physical devices of a plurality of storage tiers, said plurality of storage tiers including a first tier of one or more flash memory devices and a second tier of one or more devices having lower performance than said one or more flash memory devices;

determining a score for each of said plurality of logical volumes in accordance with a plurality of values for said each logical volume, said plurality of values including a read miss density for said each logical volume, said read miss density being determined by dividing an average number of read misses per unit of time for said each logical volume by a storage capacity of said each logical volume;

determining a ranking of said plurality of logical volumes based on the scores for said plurality of logical volumes;

determining a first threshold indicating a first position in said ranking;

determining a first portion of said plurality of logical volumes wherein each logical volume in said first portion has a position in said ranking above said first position; and automatically locating data of said first portion of logical volumes on physical devices of said first tier.

16. The non-transitory computer readable medium of claim 15, wherein said first threshold indicates a total storage capacity of said first tier.

17. The non-transitory computer readable medium of claim 15, wherein said first threshold is a promotion threshold and each of said plurality of logical volumes having a position in said ranking above said first position is moved into said first tier from another one of said plurality of storage tiers if not currently included in said first tier, and wherein a demotion threshold indicates a second position in said ranking below said first position and each of said plurality of logical volumes having a position in said ranking below said second position is moved from said first tier to another one of said plurality of storage tiers if currently included in said first tier, and wherein each of said plurality of logical volumes between said first position and said second position is not moved from a current one of said plurality of storage tiers.

18. The non-transitory computer readable medium of claim 15, wherein said determining said score for each of said plurality of logical volumes further comprises:

determining said read miss density for said each logical volume;

determining a percentage of writes to physical storage for said each logical volume;

determining a cost as a function of said percentage of writes;

determining a priority for said each logical volume; and determining said score in accordance with said read miss density, said percentage of writes, said cost, and said priority.

19. A system comprising:

a data storage system;

a non-transitory computer readable medium comprising code stored thereon for configuring data storage of the data system, the non-transitory computer readable medium comprising code for:

selecting a plurality of devices;

determining, for each of said plurality of devices, whether data for said each device should be located in a first storage tier or another storage tier, said first storage tier being a higher performance storage tier than said other storage tier; and for each of said plurality of devices that said determining determines should be located in the first storage tier, automatically locating data of said each device on a physical storage device of said first storage tier, and wherein said determining whether data for said each device should be located in said first storage tier or another storage tier further comprises:

determining a score for each of said plurality of devices in accordance with a plurality of values for said each device, said plurality of values including a read miss density for said each device, said read miss density being determined by dividing an average number of read misses per unit of time for said each device by a storage capacity of said each device.

20. The system of claim 19, wherein said first storage tier includes one or more flash memory devices and said another storage tier includes one or more physical devices having lower performance characteristics than said one or more flash memory devices.

* * * * *